No. 607,744. Patented July 19, 1898.
J. D. HAZLET.
TAPER ATTACHMENT FOR LATHES.
(Application filed Jan. 11, 1898.)
(No Model.)

Attest
James M. Spear
F. L. Middleton

Inventor
John D. Hazlet
by Wm. Spear
Atty.

UNITED STATES PATENT OFFICE.

JOHN D. HAZLET, OF CINCINNATI, OHIO.

TAPER ATTACHMENT FOR LATHES.

SPECIFICATION forming part of Letters Patent No. 607,744, dated July 19, 1898.

Application filed January 11, 1898. Serial No. 666,324. (No model.)

*To all whom it may concern:*

Be it known that I, JOHN D. HAZLET, a citizen of the United States, residing at Cincinnati, Ohio, have invented certain new and useful Improvements in Taper Attachments for Lathes, of which the following is a specification.

My invention relates to lathe attachments of the class shown by the patent to Hazlet and Lord, No. 450,016, for guiding the cutting-tool diagonally in relation to the bed, so as to give a tapered form to any object to be turned; and the object of the invention is to simplify the parts of the attachment and to provide a device for obtaining a nicety of adjustment of the tool-holder and to take up all lost motion or looseness caused by the wear of the cross-feed screw and its nut.

To this end the device includes an auxiliary adjusting-nut carried by the tool-carriage and also the details of construction, as hereinafter described, and particularly pointed out in the claims.

The invention is illustrated in the accompanying drawings, in which—

Figure 1:
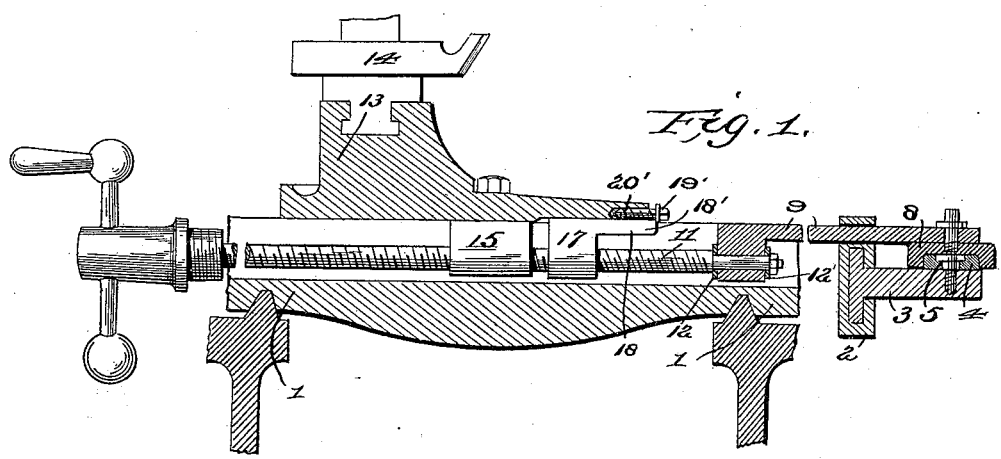
Figure 2:
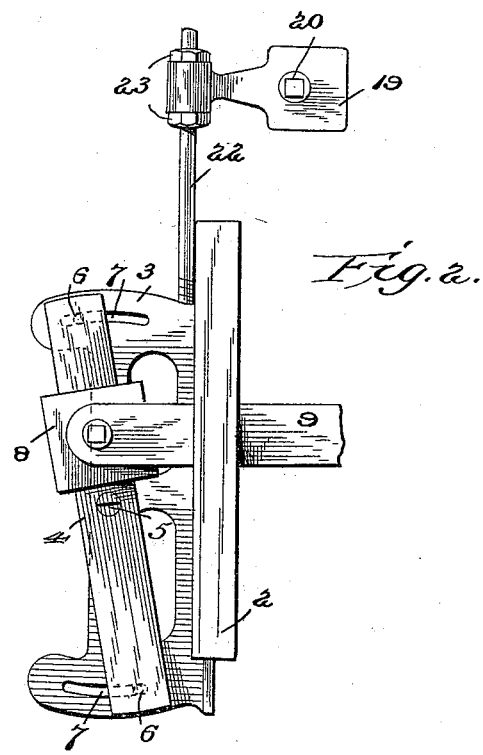

Figure 1 is a cross-section of the complete device. Fig. 2 is a detail plan view.

To one side of the lathe-bed 1 a clamp 19 is secured by a nut 20, and this clamp has an extension provided with an eye through which a rod 22 passes, which is held against longitudinal movement therein by the nuts 23, threaded on said rod on each side of the extension. The opposite end of the rod is threaded into an opening in the end of a plate 3, which has a T-shaped base fitting a corresponding groove in a casting 2, which may be secured to or form an integral part of the carriage. The plate 3 has a guide-bar 4, pivoted centrally thereon by a set-screw 5, and may be adjusted and held at any desired inclination by screws 6, extending through segmental slots 7 in said plate 3, concentric with the pivot 5. A slip-block 8, having its under side recessed to correspond to the guide, has a cross-bar 9 pivoted thereto. This cross-bar extends through an opening in the casting 2 and transversely of the bed, the end thereof being provided with a downwardly-extending portion having an opening in which the plain reduced end of the cross-feed screw 11 is journaled and retained by means of a washer 12, interposed between the shoulder formed by said reduced end and the angular end of the bar 9, and a washer and nut on the reduced end of said screw.

The tool-holder 13, carrying the tool 14, has a nut 15 rigidly secured to the bottom thereof, which engages the threads of the cross-feed screw. Upon the end of the cross-feed screw on the side of the bed opposite to the guide-rib a suitable operating-handle is keyed for rotating said screw. This will adjust the nut 15 on the screw, which in turn will move the tool-holder with the tool to or from the work. The adjustment thus secured is sometimes not as accurate as is desirable, owing to slight looseness of the threads, this being especially true when either the screw or the nut 15 has become worn in use, in which case there is more or less looseness, which causes the tool to travel unevenly in relation to the object operated upon, causing an unevenness in the finished product. To secure an accuracy of adjustment and to compensate for this looseness, a supplemental nut 17 is threaded upon the cross-feed screw, and this nut 17 has a horizontal forward extension 18, which is guided in a groove in the under face of the tool-holder. The extension projects beyond the end of the tool-holder and forms a shoulder 18', against which the head 19' of the threaded bolts 20' abut. These bolts are threaded in the ends of the tool-rest and on each side of the cross-feed screw. After the tool-rest has been adjusted to the desired position by means of the cross-feed screw any possible looseness or play between the screw and tool-rest is taken up by tightening the screws 20', which will cause the portions 15 and 17 to approach each other, thus jamming the threads and holding the tool-rest firmly against any movement independent of the cross-feed screw. The threaded end of the rod 22 permits of the accurate adjustment of the plate 3 in relation to the carriage without moving the clamp 19.

I claim as my invention—

1. In combination, the bed, the carriage, the laterally-movable tool-holder, the cross-feed screw, the nut carried by the holder engaging said screw for adjusting said holder, a second nut carried by said screw, and a second screw engaging the holder and second nut and forming an adjustable connection between the same, substantially as described.

2. In combination, the bed, the carriage, the laterally-movable tool-holder having a guide therein, the cross-feed screw, the nut carried by the holder engaging said screw for adjusting said holder, a second nut threaded on said screw slidable in said guide having an extension projecting beyond the edge of said holder, and a screw fitted into the said holder having a head bearing upon the projecting edge of said extension, substantially as described.

In testimony whereof I affix my signature in presence of two witnesses.

JNO. D. HAZLET.

Witnesses:
FRANK J. DORGER,
CHARLOTTE LINDNER.